United States Patent [19]
Rich

[11] Patent Number: 6,105,299
[45] Date of Patent: Aug. 22, 2000

[54] AUTOMATED FISHHOOK TACKLE SYSTEM

[76] Inventor: Homer C. Rich, 1100 S. Noland Rd., Independence, Mo. 64050

[21] Appl. No.: 09/220,514

[22] Filed: Dec. 24, 1998

[51] Int. Cl.[7] .................................................. A01K 91/06
[52] U.S. Cl. ............................ 43/15; 43/42.36; 43/42.04; 43/44.83
[58] Field of Search ......................... 43/15, 42.04, 42.36, 43/44.83

[56] References Cited

U.S. PATENT DOCUMENTS

| | | |
|---|---|---|
| 711,318 | 10/1902 | Hymers . |
| 2,204,560 | 6/1940 | Allison . |
| 2,374,752 | 5/1945 | Johnson . |
| 2,481,453 | 9/1949 | Stadelhofer . |
| 2,557,030 | 6/1951 | Inglis . |
| 2,559,537 | 7/1951 | Haynie . |
| 2,560,875 | 7/1951 | Knott . |
| 2,568,999 | 9/1951 | Gusner . |
| 2,582,758 | 1/1952 | Rose . |
| 2,631,399 | 3/1953 | Sowa . |
| 2,694,875 | 11/1954 | Hoffman . |
| 2,726,470 | 12/1955 | Bass . |
| 2,799,109 | 7/1957 | Remington . |
| 2,801,487 | 8/1957 | Morgan . |
| 3,006,102 | 10/1961 | Chapman . |
| 3,060,615 | 10/1962 | Spets . |
| 3,162,969 | 12/1964 | Knott . |
| 3,220,138 | 11/1965 | Greenfield . |
| 3,314,185 | 4/1967 | McCoy et al. . |
| 3,403,467 | 10/1968 | Ju . |
| 3,660,922 | 5/1972 | Chill . |
| 3,766,679 | 10/1973 | Noe . |
| 3,771,250 | 11/1973 | Helmke . |
| 3,823,501 | 7/1974 | Bybee . |
| 5,438,788 | 8/1995 | Rich et al. . |

*Primary Examiner*—Jack W. Lavinder
*Attorney, Agent, or Firm*—Shughart Thomson & Kilroy P.C.; Mark E. Brown

[57] ABSTRACT

Improvements in automatic fishhook setting devices. An automated fishhook tackle system comprising a fishing line, a hooking device and a fishhook setting device. The fishhook setting device includes a cylindrical housing with a barrel and a bore extending therethrough, and upper and lower caps. The bore contains a plunger and a compression-type coil spring. The plunger includes a shaft and upper and lower ends. The shaft of the plunger extends through the coil spring which is positioned within the bore between the lower cap of the housing and an overhanging lip formed by the upper end of the plunger. The shaft further includes a notch defining an upwardly directed abutment surface. The plunger may be drawn from the housing so as to compress the spring. When the notch is advanced out of the housing the plunger is advanced to one side of the housing so that the abutment surface may be placed in contact with an edge of an opening in the lower cap of the housing to prevent the plunger from retracting until an additional force is applied to the plunger, preferably from a fish taking a baited hook secured thereto. The device can be removably attached to a single length of fishing line.

14 Claims, 2 Drawing Sheets

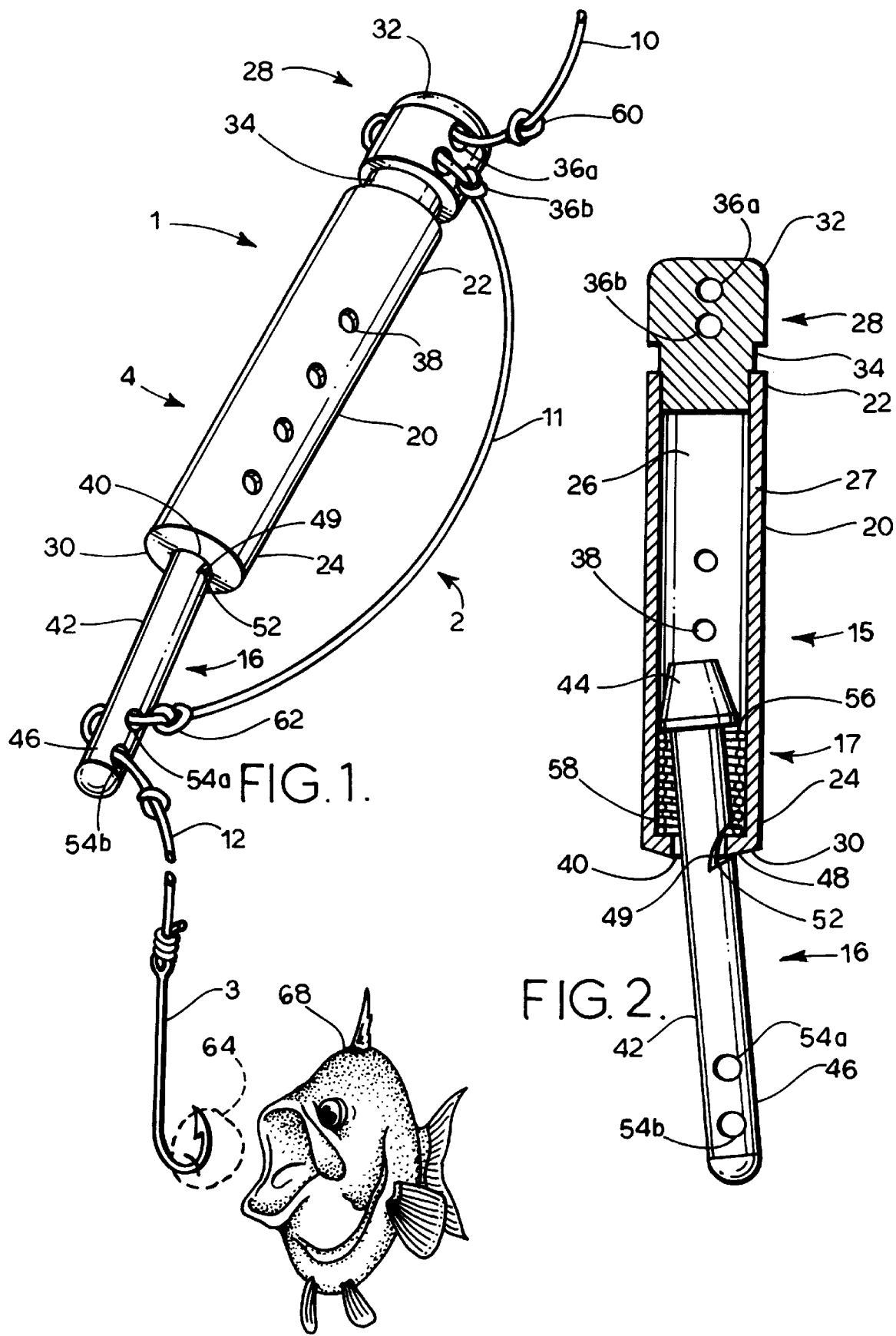

AUTOMATED FISHHOOK TACKLE SYSTEM

BACKGROUND OF THE INVENTION

1. Field of the Invention

The present invention relates generally to automated fishhook tackle systems, and in particular to an automatic fishhook setting device capable of being removably attached to a single length of fishing line.

2. Description of the Related Art

In the sport of fishing, fish are often able to remove bait from hooks before anglers are able to react and set the hooks. This is especially a problem for inexperienced or inattentive anglers.

Numerous devices have been developed to automatically set a hook when the bait is taken by a fish. Such devices are also useful in situations where an angler does not want to constantly monitor a fishing line, such as on a trot line or when an angler is simultaneously using several fishing poles.

The prior art includes the automatic fish catcher shown in the Allison U.S. Pat. No. 2,204,560. Although this catcher is relatively easy to use, its operation requires attachment to a fishing pole or other fixed end. Therefore, it would not be practical for use on a trot line or other free length of fish line. Also, unlike the present invention, the '560 patent does not serve as a sinker.

The prior art also includes the Rich et al. U.S. Pat. No. 5,438,788, which discloses a fish hook setting device. However, the '788 patent device must be attached to two separate lengths of fishing line whereas the present invention can be attached to a single length of fishing line. Additionally, it may be possible for a large fish to "free" itself from the '788 patent device by pulling with sufficient force to separate the fish hook setting device's plunger and/or cap from its housing. The present invention improves on this design by allowing the fishhook setting device (and, therefore, the fish) to remain attached to the fishing line even if the device's cap and/or plunger is separated from the device's housing.

Others have designed different devices for similar purposes. However, such devices generally are more complicated in construction and, therefore, more expensive to manufacture and more difficult to use.

The present invention addresses the shortcomings of the previous automated fishhook tackle systems. Heretofore there has not been available an automated fishhook tackle system with the advantages and features of the present invention.

SUMMARY OF THE INVENTION

The present invention generally comprises an automated fishhook tackle system including a fishing line, a hooking device, and a fishhook setting device. The fishing line includes upper, lower and transition sections. The fishhook setting device includes a cylindrical housing. The housing includes a barrel with a bore extending therethrough, sidewalls, and upper and lower caps. The upper cap includes a pair of receivers for threading the fishing line therethrough. The sidewall includes at least one port. An opening extends through the lower cap and defines an edge in the lower cap. A plunger including a shaft with upper and lower ends is positioned partially within the bore. The plunger's upper end is of a diameter slightly larger than its shaft so as to form an overhanging lip. A notch is formed on one side of the plunger shaft and two receivers are formed in the lower end of the shaft. The notch defines an abutment surface in the plunger shaft. A helical spring is positioned within the bore between the rim and the lower cap of the barrel.

A single length of the fishing line from a fishing pole or trot line may be secured to the device by threading the line through the two receivers in the upper cap and then threading the same line through the two receivers in the plunger. Knots may be tied in the fishing line as securement means.

The device is placed in a cocked or extended position by drawing the plunger shaft out of the cylindrical housing through the opening such that the plunger's upper end compresses the spring positioned within the housing's bore. The plunger is advanced to a position wherein the notch of the plunger shaft is adjacent to the edge of the opening of the lower cap. Then, the plunger is angled or advanced to one side such that the abutment surface formed by the notch in the plunger engages the edge of the opening of the lower cap whereby the device is in a cocked or extended configuration. The engagement of the abutment surface with the edge of the opening prevents the spring from expanding and driving the shaft of the plunger back within the housing.

A tug or strike from a fish taking the baited hook is sufficient to further compress the spring so as to advance the abutment surface in the plunger away from the edge of the opening in the lower cap. The spring is permitted to advance to an expanded position. The advancement of the spring to its expanded position causes the plunger shaft to retract back within the cylindrical housing. This retraction stroke results in a force sufficient to set the hook within the fish's mouth.

OBJECTS AND ADVANTAGES OF THE INVENTION

The principle objects and advantages of the present invention include: providing a device which automatically sets a fishhook when bait thereon is taken by a fish; providing such a device which may be secured to a single length of fishing line for ease in attaching the device to the line; providing such a device with a single length of line so that a caught fish remains attached to the fishing line even if the device's cap and/or housing separate from the device's plunger; providing such a device which functions as a sinker; providing such a device which permits the fishhook to swivel once the hook is set within the mouth of a fish; providing such a device which is relatively simple to manufacture; and providing such a device which is particularly well adapted for the intended usages thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a perspective view of the automated fishhook tackle system comprising the present invention.

FIG. 2 is a sectional view of the housing assembly showing the fishhook tackle system in a cocked, or extended, position.

DETAILED DESCRIPTION OF THE INVENTION

I. Introduction and Environment

Figure 3:
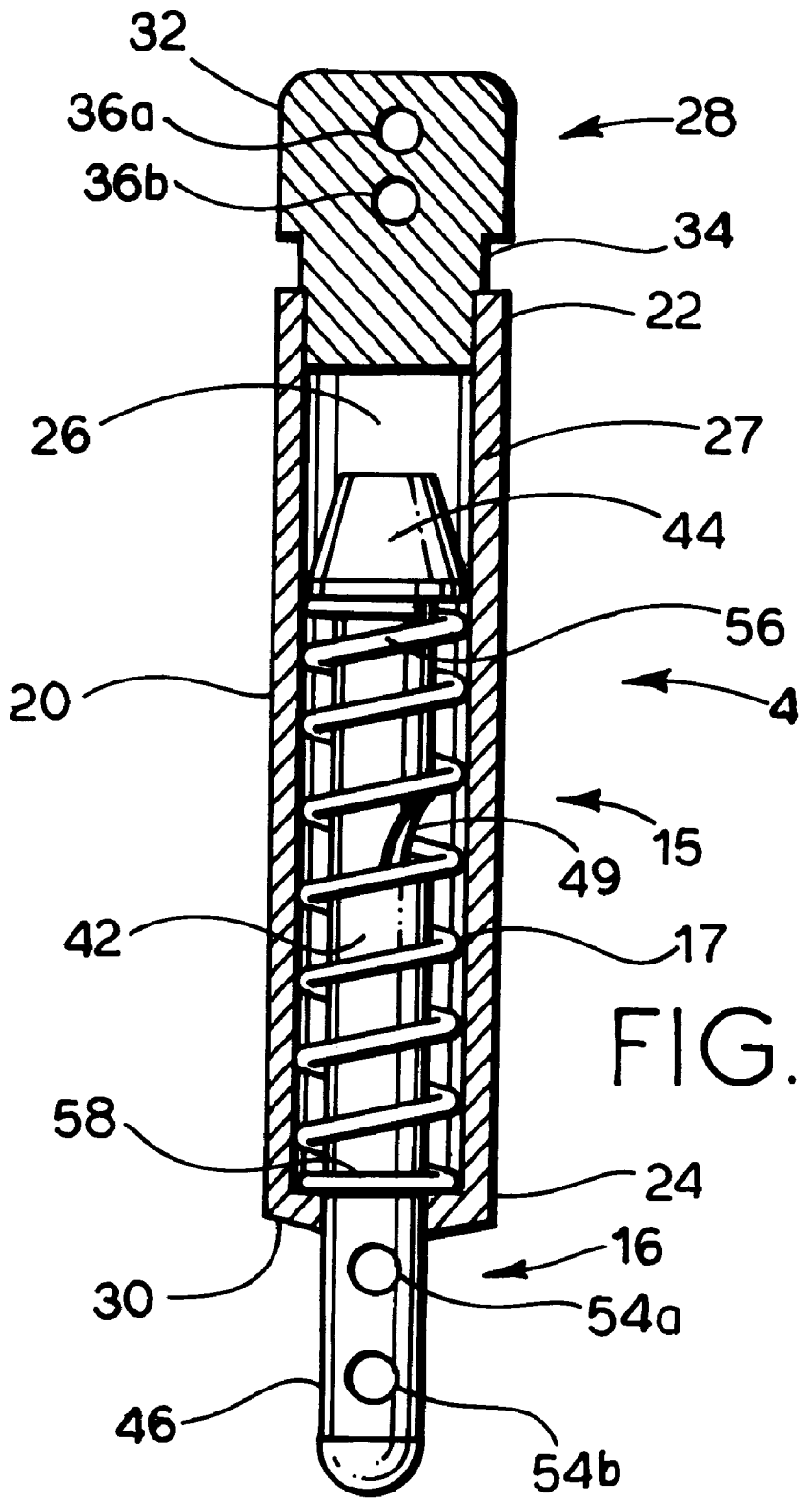
FIG. 3 is a sectional view of the housing assembly showing the fishhook tackle system in a retracted position.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, The words "upwardly", "downwardly", "rightwardly", and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in greater detail, the reference numeral 1 generally refers to an automated fishhook tackle system embodying the present invention. The fishhook tackle system 1 generally comprises a fishing line 2, a hooking device 3 and a fishhook setting device 4.

The fishing line 2 generally comprises an upper section 10, a transition section 11 and a lower section 12. The function of these sections will subsequently be discussed in greater detail.

II. Fishhook Setting Device 4.

The fishhook setting device 4 generally comprises a housing assembly 15, a plunger 16 and a spring 17. The housing assembly 15 further comprises a barrel 20 having upper and lower ends 22, 24, a bore 26 extending therethrough, and a sidewall 27. An upper cap 28 and a lower cap 30 are connected to the barrel 20 at opposite ends thereof. The upper cap 28 includes a cylindrical proximate portion 32 and a relatively larger cylindrical distal portion 34 which extends above the housing 15. The proximate portion 32 of the upper cap 28 is machined to a tolerance such that an interference fit is achieved when the proximate portion 32 of the upper cap 28 is inserted into the housing 15. Once inserted, the upper cap 28 is secured to the housing 15 by any reasonable means such as an adhesive, by threading, by peining with impact, by punching the sidewall 27 of the upper end 22 of the barrel 20, or by sonic welding. An upper pair of receivers comprising first and second receivers 36a,b extend through the distal portion 34 of the upper cap 28. A plurality of ports 38 extend through the sidewall 27 of the housing 15 and allow the housing 15 to become filled with water when submerged.

The lower cap 30 contains a circular opening 40 which opens into the barrel 20 of the housing 15. The opening defines an annular edge 41 in the lower cap 30.

The plunger 16 includes a shaft 42, an upper end 44 and a lower end 46. The diameter of the shaft 42 closely approximates but is slightly smaller than the diameter of the opening 40 of the lower cap 30. The upper end 44 of the plunger 16 has a diameter which is greater than the diameter of the shaft 42 so as to form an overhanging lip 48. A notch 49 is formed in the shaft 42 on one side thereof. The notch 49 defines an upwardly directed abutment surface 52, the function of which will be described more fully hereafter. A lower pair of receivers 54a,b comprising first and second receivers 54a,b extend through a lower end 46 of the plunger shaft 42.

The spring 17 is a compression, helical coil-type spring and includes an upper end 56 and a lower end 58. The outer diameter of the spring 17 closely approximates but is slightly smaller than the diameter of the bore 26 of the housing 17. The spring 17 is coaxially positioned within the bore 26 of the housing 15 between the lip 48 of the upper end 44 of the plunger shaft 42 and the lower cap 30 of the housing 15. The plunger 16 is positioned partly within the bore 26 of the housing 15 with the plunger shaft 42 extending downwardly through the coil spring 17 and through the opening 40. The upper end 44 of the plunger 16 and the lower cap 30 of the housing 15 engage respective upper and lower ends 56, 58 of the spring 17.

Together, the upper receivers 36a,b and lower receivers 54a,b serve as securement means for securing thereto the fishing line 2. The fishing line 2 can be threaded first through the first receiver 36a of the upper cap 28 and then threaded back in the opposite direction through the second receiver 36b of the upper cap 28. The same fishing line 2 can then be threaded through the first receiver 54a of the plunger shaft 42 and then back in the opposite direction through the second receiver 54b of the plunger shaft 42. The fishhook setting device 4 may be secured by tying it to the fishing line 2. For example, an upper knot 60 may be tied at a location adjacent to but above the first receiver 36a of the upper cap 28. The upper knot 60 approximately defines the interface between the fishing line's upper section 10 and the line transition section 11. A lower knot 62 may be tied adjacent to but above the first receiver 54a of the plunger shaft. The lower knot 62 approximately defines the interface between the fishing line's transition section 11 and lower section 12. A hooking device 3 (e.g. a hook, lure, jig, etc.) is secured to an end of the fishing line's lower section 12 and bait 64 may be secured thereto. The ends of the receivers 36a,b, 54a,b are preferably chamfered to reduce the likelihood of the edges thereof cutting the fishing line 2.

The pairs of receivers 36a,b, 54a,b also allow a caught fish to remain on the hooking device 3 of the fishing line 2 in the event the plunger 16 becomes separated from the housing 15 and/or the upper cap 28. The plunger 16 might become separated from the housing 15 and/or the upper cap 28 if a large caught fish wraps the fishing line 2 around trees, rocks, brush or other debris and pulls the fishing line 2.

III. Operation

When the spring 17 is in the extended or resting state (FIG. 3) a substantial portion of the plunger shaft 42, including the portion with the notch 49 therein, is positioned within the bore 26 of the housing 15. The lower end 46 of the shaft 42 extends downwardly and through the opening 40 beyond the lower end 24 of the barrel 20 of the housing 15. In this arrangement the fishhook setting device 4 is described as being in a retracted or released configuration.

To place the fishhook setting device 4 in a cocked or extended position the angler grasps the plunger shaft lower end 46 and draws the plunger shaft 42 out of the housing 15. This extension stroke is continued against the biasing force of the spring 17 until the abutment surface 52 is advanced slightly beyond the opening 40 of the lower cap 30 of the housing 15. The plunger shaft 42 is then advanced or angled laterally such that the abutment surface 52 is positioned below the opening 40 of the lower cap 30. The abutment surface 52 is then allowed to advance into engagement or abutting relationship with the edge 41 of the opening 40 through the biasing force of the spring 17. Abutment of the abutment surface 52 against the edge 41 of the opening 40 prevents the coil spring 17 from further advancing the plunger 16 to the retracted position. In this arrangement, the plunger 16 is in an extended position and the fish hook setting device 4 is in a cocked or readied configuration.

With the fishhook setting device 4 in a cocked configuration, the angler may drop or cast the fishing line 2 with the fishhook setting device 4 secured thereto into a body of water typically off a dock or over the side of a boat. The fishhook setting device 2 might also be used, for example, by securing a free end of the fishing line 2 to a dock, or a tree, or a float (e.g. a plastic or foam jug) and dropping or casting an end of the line 2 with the device 4 secured thereto into the water. The force of a fish 68 taking the bait 64 advances the plunger 16 laterally or downward and laterally and thereby advances the abutment surface 52 out of engaging relationship with the edge 41 of the opening 40 and out from beneath the abutment surface 52. The biasing force of the coil spring 17 then rapidly advances the plunger 16 to the retracted position which causes the hooking device 3 to rapidly advance upward in the mouth of the fish 68 so as to set the hooking device 3 therein. For the purposes of this disclosure an outwardly directed force is intended to mean a force applied to the plunger and directed laterally or downward and laterally with respect to the housing 15 so as to advance the abutment surface 52 out of engaging relationship with the edge 41 of the opening 40 and out from beneath the abutment surface 52.

In addition to functioning as a fishhook setting device, the present invention also functions as a sinker and a swivel. The plunger shaft upper end 44 is not connected to the spring 17. After the hooking device 3 has been set in the mouth of a fish 68 and the plunger 16 has advanced out of the set position, said plunger 16 freely rotates within the housing 15 thereby functioning as a swivel and reducing the likelihood that a caught fish will be able to break the fishing line 2.

Often, after being caught, fish wrap fishing lines around trees, brush, rocks, piers, docks and other objects. They often continue to pull on the fishing lines. In the event that a fish 68 pulls on the fishing line 2 with sufficient force to cause the upper cap 28 and/or the housing 15 to separate from the plunger 16 of the fishhook setting device 4, the fish 68 will nonetheless remain attached to the fishing line 2 because a single fishing line 2 is threaded through both the upper cap 28 and the plunger 16 of the fishhook setting device 4.

It is to be understood that while certain forms of the present invention have been illustrated and described herein, it is not to be limited to the specific forms or arrangement of parts described and shown.

What is claimed and desired to be secured by Letters Patent is as follows:

1. An automated fishhook tackle system including a single length of line and a fishhook setting device removably attached to said line, said fishhook setting device including:
   a) a housing assembly having:
      1) a barrel with upper and lower ends, a bore extending between said barrel ends and a sidewall with a port communicating with said bore;
      2) an upper cap with upper and lower cap receivers receiving said line, said upper cap being mounted on said barrel upper end; and
      3) a lower cap with an opening, said lower cap being mounted on said barrel lower end;
   b) a plunger including a shaft with upper and lower ends, a head mounted on said shaft upper end, upper and lower receivers located in proximity to said shaft lower end and receiving said line, and a notch formed in said shaft;
   c) a helical spring receiving said plunger shaft and positioned within said bore, said helical spring having an upper end engaging said plunger head and a lower end engaging said lower cap; and
   d) said plunger having:
      1) an extended position with a helical spring compressed between said plunger head and said lower cap, a notch receiving said lower cap adjacent to said plunger shaft telescopically extended from said bore; and
      2) a retracted position with said notch released from said lower cap, said spring extended and said plunger shaft telescopically retracted into said bore.

2. The automated fishhook tackle system of claim 1, wherein:
   a) the line is removably attached to the fishhook setting device by tying a knot in the line in at least one of the following locations:
      1) above the upper receiver of the upper cap;
      2) below the lower receiver of the upper cap;
      3) above the upper receiver of the plunger; or
      4) below the lower receiver of the plunger.

3. The automated fishhook tackle system of claim 1 wherein:
   a) said fishhook setting device housing includes a plurality of said ports extending through said sidewall and communicating with said bore.

4. The automated fishhook tackle system of claim 1, which includes:
   a) a hooking device removably attached to the line.

5. The automated fishhook tackle system of claim 1 wherein the fishhook setting device is constructed of metal.

6. An automated fishhook tackle system, which comprises:
   a) a line including:
      1) an upper section;
      2) a lower section;
      3) a transition section located between said upper and lower sections;
      4) an upper knot between said upper and transition sections; and
      5) a lower knot between said transition and lower section;
   b) a hooking device connected to said lower line section;
   c) a fishhook setting device including:
      1) a housing assembly with a barrel having upper and lower ends and a bore extending between said barrel ends, an upper cap with a pair of upper cap receivers receiving said line adjacent to said upper knot, said upper cap being mounted on said barrel upper end, a lower cap with an opening, said lower cap being mounted on said barrel lower end, and a sidewall with a port communicating with said bore;
      2) a plunger including a shaft with upper and lower ends, a head mounted on said shaft upper end, a pair of plunger receivers located in proximity to said shaft lower end and receiving said line adjacent to said lower knot, and a notch formed in said shaft;
      3) a helical spring receiving said plunger shaft and positioned within said bore, said helical spring having an upper end engaging said plunger head and a lower end engaging said lower cap;
      4) said plunger having an extended position with said spring compressed between said plunger head and said lower cap, said notch receiving said lower cap adjacent to said lower cap opening and said plunger shaft telescopically extended from said bore; and 5) said plunger having a retracted position with said notch released from said lower cap, said spring extended and said plunger shaft telescopically retracted into said bore;

d) said line being received in said upper cap receiver pair and said plunger receiver pair with said line transition section positioned between said receiver pairs;

e) said upper knot being positioned adjacent to said upper cap receiver pair and said lower knot being positioned adjacent to said plunger receiver pair; and f) said line transition section having sufficient length to extend between said upper cap and plunger receiver pairs with said plunger in its extended positioned.

7. The automated fishhook tackle system of claim 6 wherein:

a) said fishhook setting device housing includes a plurality of said ports extending through said sidewall and communicating with said bore.

8. The automated fishhook tackle system of claim 6 wherein the fishhook setting device is constructed of metal.

9. An improved automated fishhook tackle system of the type including a fishhook setting device having: a plunger secured within a bore of a housing having an upper cap and a lower cap with an opening extending through said lower cap, said plunger extending through said bore and through said opening; a coil spring positioned within the housing between an upper end of said plunger and the lower cap of said housing, said plunger being retractable to or extendable from said housing; and a fishing line and fishing hook securable to said device; wherein the improvement comprises:

a) securement means for securing a continuous fishing line to a fishhook setting device from a point above an upper cap of said device to a point below a plunger of said device such that a first free length of said fishing line extends from said upper cap of said device and a second free end of said fishing line extends from said plunger of said device, said securement means comprising:
1) a pair of upper receivers in said upper cap;
2) a pair of lower receivers in said plunger; and
3) said line includes:
   i) an upper section;
   ii) a lower section;
   iii) a transition section located between said upper and lower sections;
   iv) an upper knot between said upper and transition sections; and
   v) a lower knot between said transition and lower sections.

10. A fishhook setting device for an automated fishhook tackle system including a single length of line, which device includes:

a) a housing assembly having:
   1) a barrel with upper and lower ends, a bore extending between said barrel ends and a sidewall with a port communicating with said bore;
   2) an upper cap with upper and lower cap receivers adapted to removably receive said single length of line, said upper cap being mounted on said barrel upper end; and
   3) a lower cap with an opening, said lower cap being mounted on said barrel lower end;

b) a plunger including a shaft with upper and lower ends, a head mounted on said shaft upper end, upper and lower receivers located in proximity to said shaft lower end and adapted to removably receive said single length of line, and a notch formed in said shaft;

c) a helical spring receiving said plunger shaft and positioned within said bore, said helical spring having an upper end engaging said plunger head and a lower end engaging said lower cap; and d) said plunger having:
   1) an extended position with a helical spring compressed between said plunger head and said lower cap, a notch receiving said lower cap adjacent to said plunger shaft telescopically extended from said bore; and
   2) a retracted position with said notch released from said lower cap, said spring extended and said plunger shaft telescopically retracted into said bore.

11. The fishhook setting device of claim 10, wherein:

a) the line is removably attached to the device by tying a knot in the line in at least one of the following locations:
   1) above the upper receiver of the upper cap;
   2) below the lower receiver of the upper cap;
   3) above the upper receiver of the plunger; or
   4) below the lower receiver of the plunger.

12. The fishhook setting device of claim 10, wherein:

a) said housing includes a plurality of said ports extending through said sidewall and communicating with said bore.

13. The fishhook setting device of claim 10, wherein:

a) the upper and lower cap and plunger receivers receive the line.

14. The fishhook setting device of claim 10, wherein the device is constructed of metal.

\* \* \* \* \*